July 19, 1960 P. F. MAEDER 2,945,697

MEANS FOR RENDERING TAPE RECORDERS AND THE LIKE OPERATIVE UNDER HIGH ACCELERATION AND DECELERATION CONDITIONS

Filed Aug. 16, 1957

5 Sheets-Sheet 1

INVENTOR:
PAUL FRITZ MAEDER
BY
Dike, Thompson, Sanborn & Bronstein
ATTORNEYS

July 19, 1960 P. F. MAEDER 2,945,697

MEANS FOR RENDERING TAPE RECORDERS AND THE LIKE OPERATIVE UNDER HIGH ACCELERATION AND DECELERATION CONDITIONS

Filed Aug. 16, 1957 5 Sheets-Sheet 2

INVENTOR:
PAUL FRITZ MAEDER
BY
Dike, Thompson, Sanborn & Bronstein
ATTORNEYS:

July 19, 1960 P. F. MAEDER 2,945,697

MEANS FOR RENDERING TAPE RECORDERS AND THE LIKE OPERATIVE UNDER HIGH ACCELERATION AND DECELERATION CONDITIONS

Filed Aug. 16, 1957 5 Sheets-Sheet 3

INVENTOR:
PAUL FRITZ MAEDER
BY
Dike, Thompson, Sanborn & Bronstein
ATTORNEYS.

MEANS FOR RENDERING TAPE RECORDERS AND THE LIKE OPERATIVE UNDER HIGH ACCELERATION AND DECELERATION CONDITIONS

Filed Aug. 16, 1957

5 Sheets-Sheet 4

INVENTOR:
PAUL FRITZ MAEDER
BY
Dike, Thompson, Sanborn & Bronstein
ATTORNEYS.

INVENTOR:
PAUL FRITZ MAEDER
BY
Dike, Thompson, Sanborn & Bronstein
ATTORNEYS.

United States Patent Office 2,945,697
Patented July 19, 1960

2,945,697

MEANS FOR RENDERING TAPE RECORDERS AND THE LIKE OPERATIVE UNDER HIGH ACCELERATION AND DECELERATION CONDITIONS

Paul F. Maeder, Rumford, R.I., assignor to Speidel Corporation, Providence, R.I., a corporation of Rhode Island Filed Aug. 16, 1957, Ser. No. 678,503

15 Claims. (Cl. 274—11)

The present invention relates to a device for recording intelligence on a tape, as for example, a magnetic tape or a photographic film.

Presently known devices of this type fail to function properly at the great acceleration and deceleration rates which are required in missiles, other airborne equipment, and in certain equipment on the ground such as centrifuges.

The reason for this is that the inertia forces acting on the tape cause the contacting layers thereof to bind and the tape to elongate and break. It also causes the transport mechanism to stall. This has presented a pressing problem in the development of recording and playback devices to record and play back intelligence in missiles in flight.

The present invention provides such a device which will function properly at, and substantially in excess of, these acceleration and deceleration rates as well as at rest.

This is done by immersing the tape in a liquid, preferably having a specific gravity which is the same or reasonably close to the specific gravity of the tape.

Ordinarily, the tape is stored on a reel or some other storing means and a transport mechanism is included which transports the tape.

It has been found that the best results are obtained when the means for storing the tape and the transport mechanism, including the driving mechanism for driving the tape, are also immersed in the liquid.

Even better results are obtained if, in the case of magnetic tape recorders, the gap surfaces of the recording and playback heads are also immersed in the liquid.

The units which are immersed in the liquid are located in a liquid-proof chamber or cavity which is substantially filled with the liquid.

Although the best results are obtained when the specific gravity of the liquid is made as close as possible to the specific gravity of the tape, satisfactory results are obtained so long as the specific gravity of the liquid is close enough to the specific gravity of the tape to reduce the inertia effect on the tape to a level which is tolerable under the particular conditions under which it is being used. For example, if it is intended to subject the device to a maximum acceleration or deceleration of 40 $g$'s ($g$ is equal to the force of gravity so that 40 $g$'s is 40 times the force of gravity) then it is necessary only to have the specific gravity of the tape within 2½ percent (1 to 40) of the specific gravity of the liquid in order to reduce the effect of inertia forces on the tape to 1 $g$. On the other hand, if the device is to be subjected only to a maximum acceleration or deceleration of 20 $g$'s, then the specific gravity of the tape must be within 5 percent (1 to 20) of the specific gravity of the liquid to reduce the effective $g$ forces on the tape to 1 $g$. Thus, the permissible difference in the specific gravity of the tape and the liquid depends upon the maximum acceleration or deceleration to which the device is intended to be subjected. However, it is pointed out that some units are capable of operating acceptably at a $g$ force which is greater than one without the use of the liquid. In such cases, the permissible difference between the specific gravity of the liquid and that of the tape is that which reduces the effective $g$ forces on the tape so that maximum $g$ force at which the device will operate properly.

It has been found that the ratio of the effective inertia force on the tape achieved by use of the liquid to the actual inertia force to which the device is subjected is in direct proportion to the ratio of the difference between the specific gravity of the tape and the specific gravity of the liquid to the specific gravity of the tape. The term "difference in specific gravities of said tape and said liquid," as used in the claims hereof includes a difference of zero when the specific gravities of the tape and liquid are substantially the same.

When the transport mechanism is immersed in the liquid, the parts thereof which must have freedom of translatory motion in at least one direction are preferably made to have a mean specific gravity equal or reasonably close to the specific gravity of the liquid. However, it is to some advantage to have the mean specific gravity of all the parts of the transport mechanism, which have surfaces contacting and moving with respect to other surfaces, equal or reasonably close to the specific gravity of the liquid. Again the same proportions referred to above with respect to the tape are applicable. One method of doing this is by combining certain materials of different specific gravities such as nylon and metal to provide the desired means specific gravity of the part or parts.

The liquid must not only have the physical specific gravity properties required but it should be substantially inert to the parts with which it comes in contact so that it will not react therewith to any harmful degree. Liquid halogenated carbon compounds, particularly organic fluorocarbon compounds, have been found to be suitable since they are relatively inert chemically. Fluorinated cyclic ethers are preferred. A completely fluorinated cyclic ether with the empirical formula $C_8F_{16}O$ and sold under the trade name "Fluorochemicals FC75" by the Fluorochemical Division of the Minnesota Mining & Manufacturing Company is particularly satisfactory. It is understood, however, that the invention is not limited to any particular liquid but that any liquid can be used which will provide the cormrect specific gravity and which is substantially inert with respect to the parts with which it comes in contact. In fact, a fluid other than liquid, e.g. a gas, can be used providing the specific gravity thereof is suitable and it is chemically inert and and the use of such a fluid is within the scope of the invention.

The specific gravity of the liquid can be adjusted by dissolving a hydrocarbon such as heptane in the fluorocarbon, by mixing different fluorocarbons, e.g. different fluorinated cyclic ethers, of different specific gravities and by dissolving Freon gas in the fluorocarbon mixture so that any desired specific gravity can be obtained.

The invention will be more fully understood by referring to the accompanying drawings in which corresponding elements of different views are designated by like reference characters and in which a specific embodiment of the invention is shown.

Figure 1:
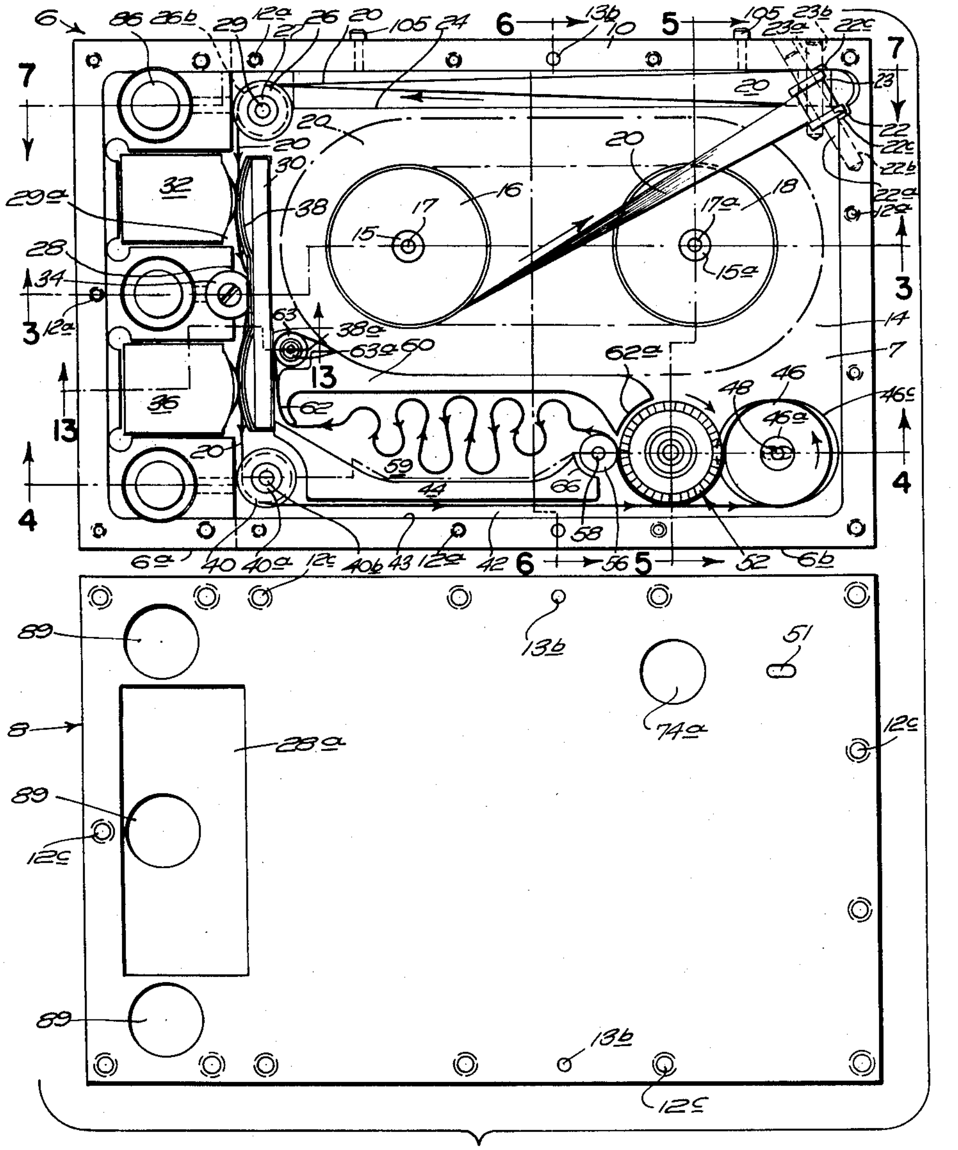
Fig. 1 is a plan view of a tape recorder embodying the present invention with the cover and the liquid removed and the cover rotated 180 degrees about its longitudinal axis to show the bottom thereof.
Figure 12:
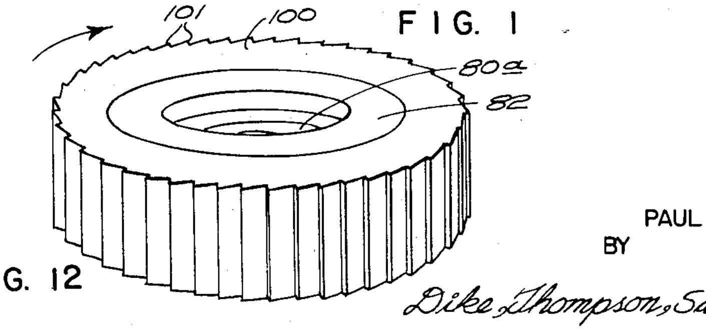
Figures 2, 8, 9:
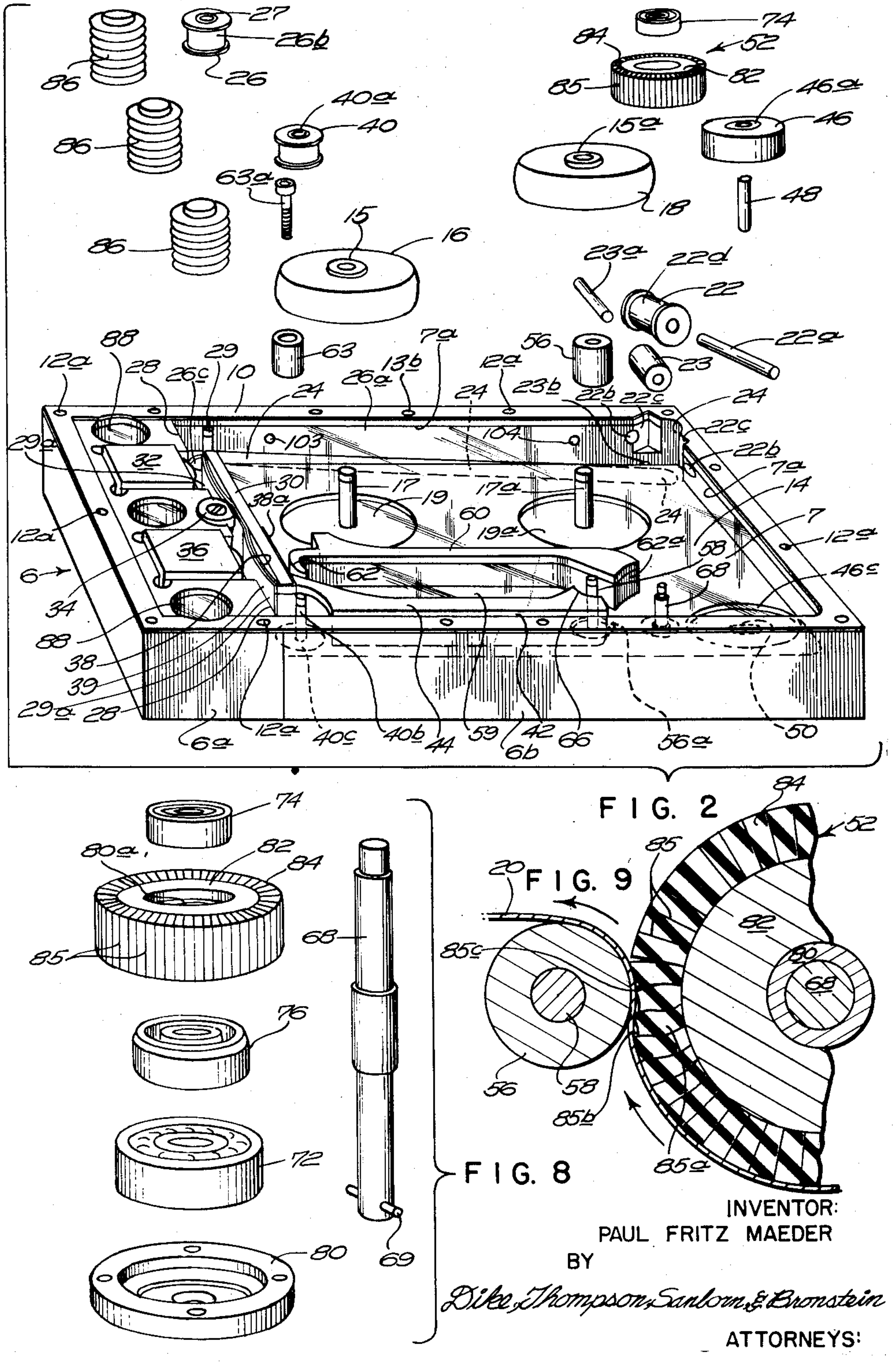
Fig. 2 is an exploded view in perspective of the recorder of Fig. 1 with the tape removed.
Figure 6:
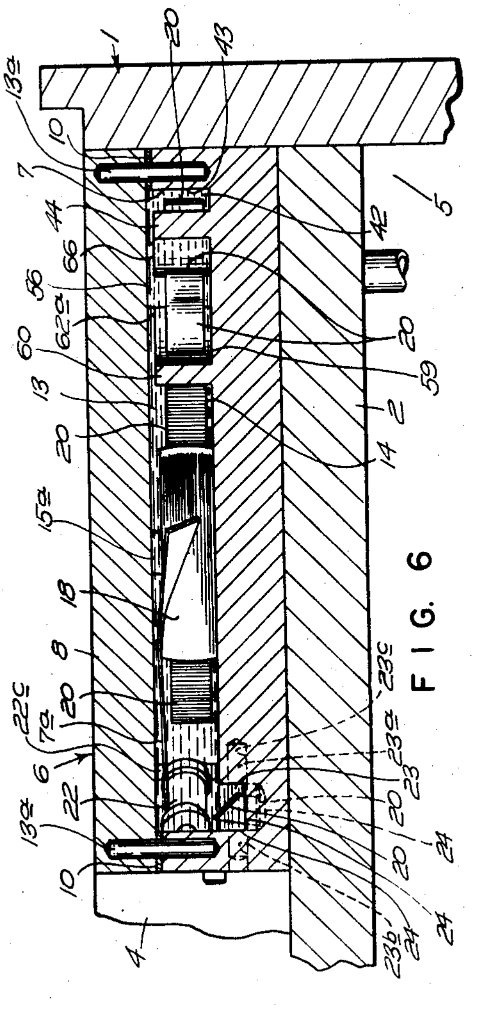
Figures 4, 5:
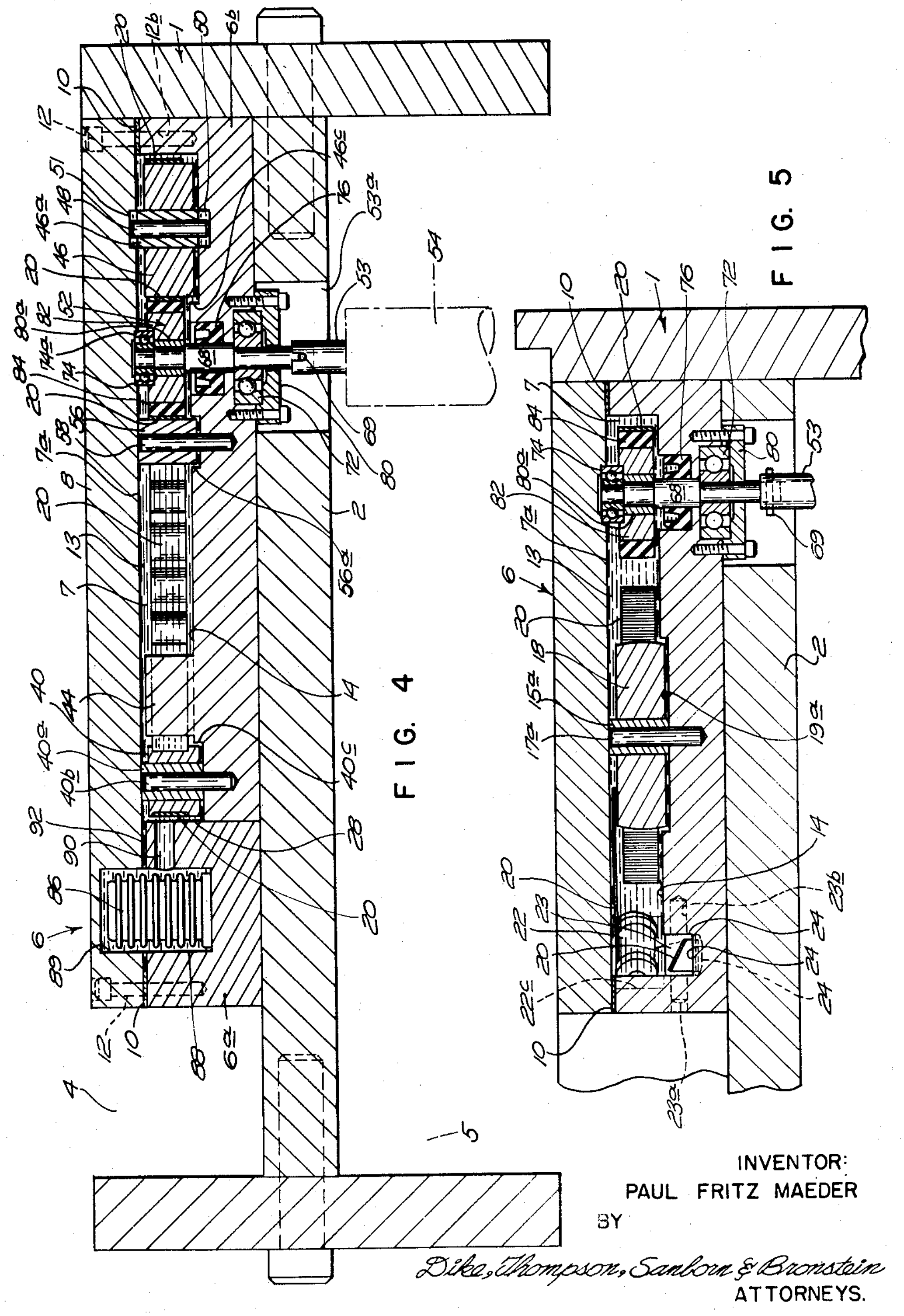
Fig. 4 is a section taken on the line 4—4 of Fig. 1 showing the cavity full of liquid, the cover in place and the supporting structure.
Figures 7, 10, 11, 13:
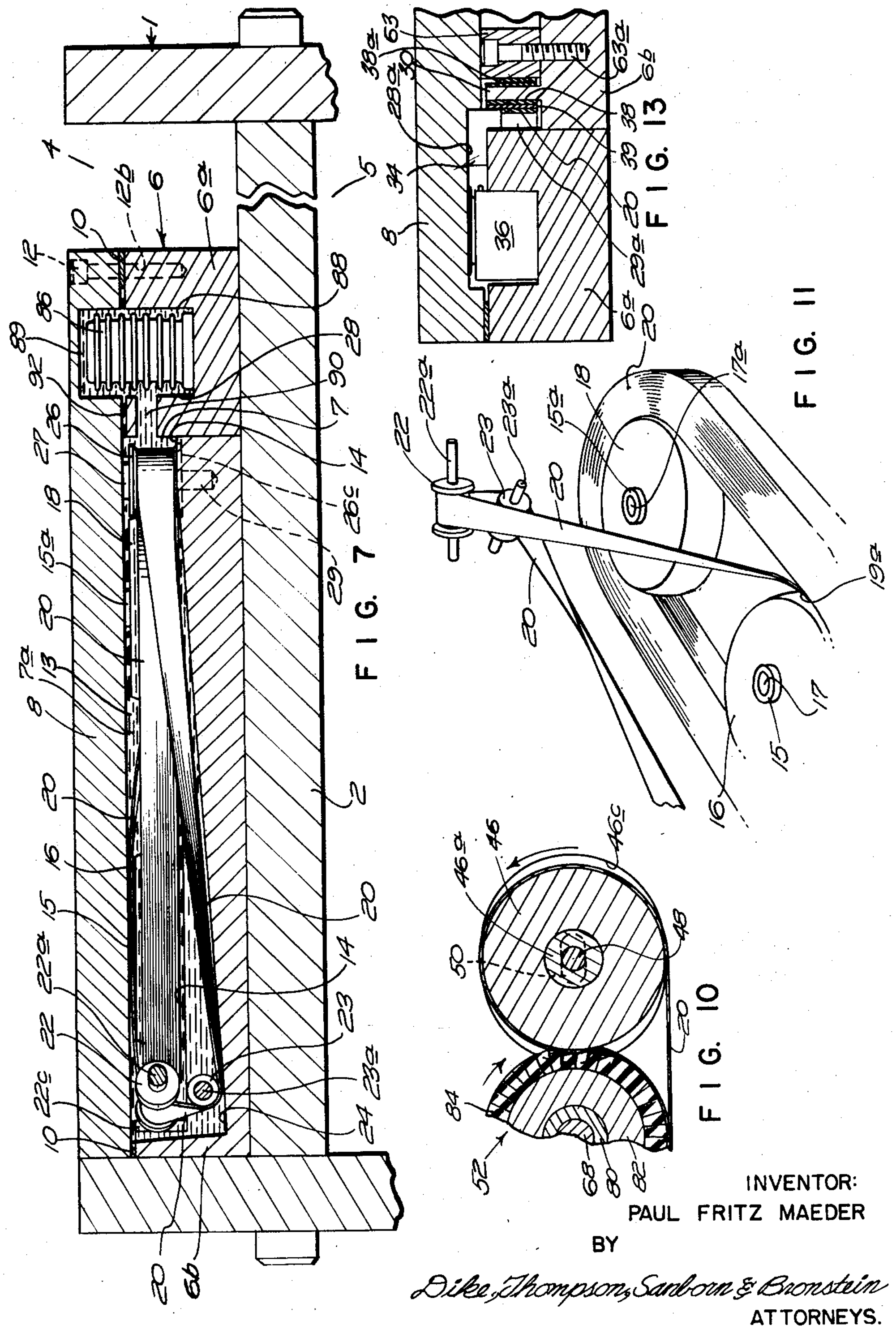

Fig. 5 is a section taken on the line 5—5 of Fig. 1 showing the cavity full of liquid, the cover in place and a part of the supporting structure;

Fig. 6 is a section taken on the line 6—6 of Fig. 1 showing the cavity full of liquid, the cover in place and a part of the supporting structure;

Fig. 7 is a section taken on the line 7—7 of Fig. 1 showing the cavity full of liquid, the cover in place and the supporting structure;

Fig. 8 is an exploded view in perspective of the drive capstan;

Fig. 9 is an enlarged section of the drive capstan, a guide roll which cooperates therewith and the tape passing therebetween during operation of the recorder;

Fig. 10 is an enlarged section of the drive capstan and the tension guide roll in tape driving position with respect to the tape and capstan;

Fig. 11 is a view in perspective of a part of the coil of tape and the guide mechanism for pulling the tape from the inside of the coil;

Fig. 12 is a view in perspective of an alternate construction of the drive capstan; and Fig. 13 is a view taken along the line 13—13 of Fig. 1.

Figure 3:
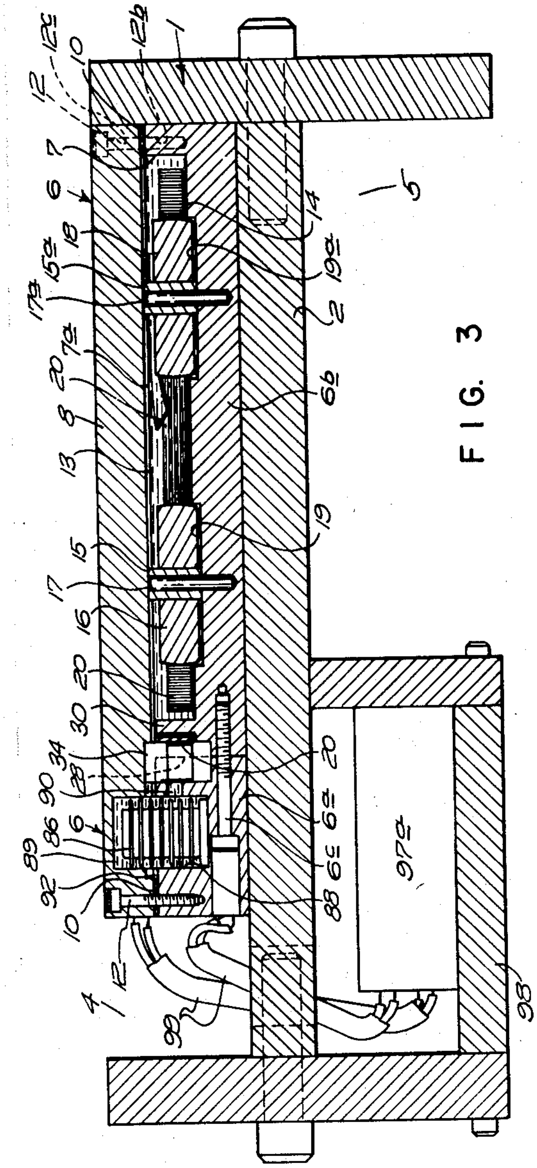
Fig. 3 is a section taken on line 3—3 of Fig. 1 showing the cavity full of liquid, the cover in place and the supporting structure on which the recorder is supported.

With the reference to the drawings, 1 represents a frame or support having a diving platform 2 dividing the interior of the support into a top space 4 and a bottom space 5. Cartridge 6, containing a recorder and playback mechanism, is detachably attached to the top of platform 2 by means of screws (not shown). The cartridge is in the form of a plate made up of two pieces 6*a* and 6*b* joined together in a liquid-tight manner by threaded bolts 6*c* (see Fig. 3). The plate has a cavity 7 in the top thereof. Cover 8 closes the top of the cavity in a liquid-proof manner and is attached to the top of the plate by means of a sealing gasket 10 and screws 12 passing through apertures 12*c* in the cover and 12*a* in the gasket into threaded apertures 12*b* in the plate (see Fig. 3). Guide pins 13*a* (Figs. 1, 2 and 6) cooperate with matching recesses 13*b* in the plate, gasket and cover to aid in placing and maintaining the cover in correct position. The sealed cavity 7 is filled with a liquid 7*a*. The cavity 7 and cover 8 form a sealed chamber 13 which is filled with liquid 7*a* and which is liquid-proof.

Rotatably mounted in cavity 7 by means of bronze bushings and 15 and 15*a* (see Figs. 1, 2 and 3) and pins 17 and 17*a* extending upwardly from the floor 14 of the cavity are a pair of reels or spools 16 and 18 respectively, the bottom portion of each of which is received in a circular recess, 19 in the case of reel 16 and 19*a* in the case of reel 18, in the floor 14. The peripheries of reels 16 and 18 are convex (see Fig. 3) to centralize the tape vertically on the reels and aid in transport of the tape.

A multi-layer, spirally wound coiled bundle of tape 20 is arranged or stored around the reels 16 and 18 as shown.

The tape 20 is transported or pulled inwardly and upwardly from the inner coil or layer of the bundle partially around the periphery of reel 16 (see Figs. 1, 6, 7 and 11) over the top of reel 18 and the upper edge of the coil of tape 20, over guide roll 22 and under guide roll 23, both guide rolls being rotatably mounted on horizontal pins 22*a* and 23*a* respectively which are in turn mounted in a corner of the cavity. Pin 22*a* is so mounted by means of a pair of apertures 22*b* in the adjacent walls of the cavity forming the corner. Recesses 22*c* are provided in the adjacent walls of the cavity to accommodate the ends of roll 22. The tape contacting portion of the periphery of roll 22 is recessed at 22*d*. Top roll 22 changes the attitude of the tape from vertical to horizontal and lower horizontal roll 23 changes the direction of movement of the tape as shown. The top of the tape contacting periphery of top roll 22 is located slightly above the top of the coil 20 (see Figs. 5, 7 and 11) to permit the tape to clear the top of spool 18 and the top of coil 20. Although in the drawings the top of the tape contacting periphery of roll 22 is slightly below the portion of the top of reel 18 over which the tape is pulled, friction can be reduced somewhat by locating roll 22 so that the top of the tape contacting periphery thereof is slightly above this portion of roll 18 as well as the top of coil 20.

A groove 24 (see Figs. 1, 2, 6, 7) is milled in an edge of the floor 14 of the cavity 7 and extends from under the lower roll 23 toward guide roll 26. It becomes shallower as it approaches the roll 26 so that the floor thereof forms a ramp. One wall of the groove lies in the same plane as wall 26*a* (see Fig. 2) of the cavity and forms a continuous wall therewith. Roll 23 is located in the deepest end of the groove and is mounted therein by means of apertures 23*b* (see Figs. 1, 2, 5 and 6) in the opposite sides of the groove and into which the ends of pin 23*a* extend. This groove provides clearance for the tape as it emerges from under the bottom roll 23 in a horizontal attitude.

The tape is pulled from under roll 23 through groove 24 and around the periphery of guide roll 26 which is made of nylon and which is rotatably mounted in the cavity by means of bronze bushing 27 and a pin 29 extending upwardly from floor 14 of the cavity. The tape contacting surface of the roll 26 is recessed at 26*b* in order to hold the tape in place. Since the guide roll 26 is mounted on vertical pin 29 it changes the attitude of the tape from horizontal back to vertical. The bottom of roll 26 is received in recess 26*c* in floor 14 as shown in Figs. 2 and 7.

From guide roll 26, the tape 20 is pulled through a guide trough 29*a* (see Figs. 1, 2) formed by the wall 28 of the cavity 7 and a stationary guide bar 30 rising from the floor 14 of the cavity. Wall 28 comprises an edge of portion 6*a* of the cartridge plate 6, as shown. In passing through this trough the tape 20 passes in front of the playback head 32, the erasing head 34 and recording head 36, which are mounted in recesses in the top of portion 6*a* of the cartridge with their gap faces protruding slightly from the wall 28. The tops of the heads extend slightly above the top surface of plate 6*a* and are received in a complementary recess 28*a* (see Fig. 1) in cover 8. The tape passes in front of these gap surfaces and is pressed firmly thereagainst by means of a leaf spring 38 biased by bar 30 against a felt pressure pad 39 which is glued to the spring 38 and which in turn presses the tape against the gap surfaces of the three heads.

The free ends of the spring 38 extend around the ends of bar 30, as shown in Figs. 1 and 2, with one end 38*a* thereof extending some distance along the rear face of the bar.

From trough 29*a* the tape is pulled or guided around the periphery of guide roll 40 (see Figs. 1, 2 and 4) which is similar in construction to guide roll 26 and which is made of nylon and is rotatably mounted by means of bronze bushing 40*a* on a pin 40*b* extending upwardly from the floor 14 of the cavity. The periphery of the roll 40 is recessed like 26 and the bottom portion thereof is received in a recess 40*c* in the floor 14.

From roll 40 the tape is pulled through a second guide trough 42 (see Figs. 1, 2 and 6) formed by a wall 42 of the cavity and a stationary guide member 44 rigidly mounted on the floor of the cavity as shown.

From the trough 42, the tape is pulled around the periphery of nylon tension guide roll 46 (see Figs. 1, 2, 4 and 10) which is rotatably mounted in cavity 7 by means of brass bushing 46*a* and a separable floating pin 48, the bottom of which pin is rotatably and slidably mounted in an elongated slot 50 in the floor of the cavity and the top of which is rotatably and slidably mounted in a corresponding elongated slot 51 in the cover 8. Slots 50 and 51 extend in a direction so that the tension guide roll 46 is free to slidably move toward and away from, and in so doing, into and out of driving relationship with, the rotating drive capstan 52, to be hereafter described (see Fig. 4). The tension of the tape 20 moving around the periphery of tension roll 46 forces the tension roll to the left into driving relationship with the periphery of the rotating drive capstan 52 as shown in Figs. 1, 4 and 10. The bottom of tension roll 46 is received in an elongated oval shaped recess 46c in the floor 14 in which recess the roll is adapted to slide when moving into and out of driving relationship with the capstan. When the tension roll is in driving relationship with the capstan it presses the tape 20 firmly against the rotating periphery of the capstan, as shown in Figs. 1, 4 and 10.

After passing around the periphery of the tension guide roll 46, the tape passes between the periphery of the tension guide roll 46 and the periphery of the driving capstan 52 (see Figs. 1, 10 and 4). which is rotatably coupled to the drive coupling 53 (see Figs. 4 and 5) of a motor 54, located below the platform 2. It is this rotating drive capstan which pulls or transports the tape from the inside of the coil, past the heads and around tension roll 46, the tape being held in frictional driving contact with the periphery of the capstan by such tension roll during operation of the device.

The tape passes from between drive capstan 52 and roll 46 partially around the periphery of the drive capstan 52 and then between such periphery and the periphery of the nylon guide roll 56 (see Figs. 1, 2, 4, 6 and 9), rotatably mounted on a pin 58 extending upwardly from the floor of the cavity. The bottom portion of roll 56 is received in a recess 56a in the floor 14. The roll 56 is so located with respect to drive capstan 52 that the tape is firmly pressed between the peripheries thereof (see Figs. 4 and 9).

From between 56 and 52, the tape passes through an expansion space 59 formed between the stationary guide member 44 and another stationary guide member 60 (see Figs. 1, 2, 4 and 6) which is also rigidly mounted on the floor 14 of the cavity. From the expansion space 59 the tape passes around the contoured end 62 (Figs. 1–2) of stationary guide member 60 through the funnel shaped space between the contoured end 62 and the flat end portion 38a of spring 38, as shown in Fig. 1. The tape then passes around guide roll 63, which is mounted on floor 14 by means of threaded screw 63a (see Figs. 1 and 2) and in so doing passes between the periphery of roll 63 and the flat end portion 38a of spring 38 (Fig. 1). Roll 63 is so arranged with respect to the spring end 38a that the moving layer of tape fits loosely therebetween.

The tape moves from between guide roll 63 and flat end portion 38a partially around the periphery of roll 63 and then back to the outside of the spiral multi-layer coil 20. It then moves from the outside of the coil to the inside and is again transported along the path set forth above so that the tape follows a continuous path.

As shown in Fig. 1, there is slack in the tape in chamber 59 and it assumes a position similar to that shown. The purpose of the slack is to remove tension on the tape before it is rewound onto the outside of the spiral coil. The contoured end 62 of stationary guide member 60 cooperates with the flat end portion 38a of spring 38 and roll 63 (see Figs. 1 and 2) to prevent the transport of a double or folded section (layer) of tape from the expansion space 59 back to the outside of the coil. These parts are so designed that a folded section cannot pass between roll 63 and the end portion 38a of spring 38, such folded section being straightened out before the tape passes therebetween.

The close fit between the contoured end 62a of member 60 and the periphery of drive capstan 52 serves to peel or scrape the tape off the periphery of the capstan in the event it continues to rotate therewith after it passes from between the capstan and guide roll 56. The close fit between the contoured end portion 66 of stationary guide member 44 and the periphery of guide roll 56 peels or scrapes tape off from such periphery in the event it continues to rotate therewith after passing from between the roll 56 and capstan 52.

The drive capstan 52 comprises a main shaft 68 (see Figs. 1, 2, 4, 5 and 8) having a key 69 (Figs. 4, 5 and 8) at the lower end thereof which is coupled to a clevis type slot in the drive coupling 53 attached to the motor shaft of motor 54. The main shaft 68 extends through an aperture 53a in platform 2, through plate 6b and the floor of cavity 7 into the cavity itself. It is rotatably mounted on the plate 6b and cover 8 by ball bearing assembly 72 in the plate and ball bearing assembly 74 received in recess 74a (see Figs. 1, 4 and 5) in the cover 8. It is provided with a liquid seal 76 and the ball bearing assembly 72 is provided with a retaining cap 80 screwed to the bottom of the plate. The portion of the shaft 68 which extends into the cavity 7 has mounted thereon by means of a press fitted bushing assembly 80a and 82 a rubber tire or roll 84 which is vulcanized to the periphery of bushing 82 and the periphery of which has a plurality of knife slits 85 therein extending in a direction parallel to the axis of the roll. Although the slits are shown extending all the way through the rubber tire or roll 84, they can extend only part way through.

Normally the rubber roll 84 appears as shown in Figs. 2 and 8. During operation, however, the pressure of the rolls 46 and 56 against the periphery thereof forces the portions of the rubber roll adjacent to rolls 46 and 56 to take on the sawtooth configuration shown in Figs. 9 and 10, which provides traction between the periphery of the rubber roll and the surface of the tape which it contacts and thereby prevents the periphery of the drive capstan from any substantial slipping with respect to the tape in spite of the fact that there is a layer of liquid on the surface of the tape and the periphery of the capstan. Each rubber segment 85a is deformed to form a corner or edge 85c and wedge shaped spaces 85b between the periphery of the rubber roll 84 and the surface of the tape whereby liquid is removed from the tape surface and escapes through the spaces 85b in accordance with the principles of the theory for highly viscous fluids to thereby provide the desired traction and intimate contact between the periphery of roll 84 and the surface of the tape. It is believed that in effect a fluid pressure gradient is set up in a circumferential direction in each space 85b which forces fluid out of the large end of the space and sucks the tape against a portion of the periphery of the segment 85a forming a wall of the small end of the space. The same effect is produced on the periphery of the rubber roll wherever it is contacted by tape in substantial tension. If the rubber periphery of the drive capstan is smooth, it will not drive the tape through the liquid at sufficient speed.

An alternate construction of the capstan roll is shown in Fig. 12 in which a rigid roll 100 made up of metal or some other rigid material is press fitted around the periphery of bushing 82. The periphery of 100 is provided with a plurality of sawtooth serrations 101, as shown, which provide traction between the periphery and the tape surface when roll 100 is rotated in the direction of the arrow. It is noted in Figs. 9 and 10 that the shape into which the portions of the rubber periphery of rubber roll 84 adjacent rolls 46 and 56, is forced corresponds to the sawtooth serrations of Fig. 12. It is believed that the same action takes place. Although in the drawings roll 84 is made of rubber, it can be made of any flexible, resilient, elastic, rubber-like material.

A plurality (three) of gas filled bellows 86 (Figs. 1, 2, 3, 4 and 7) are located in recesses 88 in the top surface of plate portion 6a to the left of the cavity and heads 32, 34 and 36. The tops of these bellows are received in matching recesses 89 in the cover. A hole 90 provides communication between the cavity 7 and each recess 88 (see Figs. 3, 4 and 7) whereby liquid can flow therebetween. The purpose of these bellows is to provide for expansion of the liquid due to changes in temperature.

When the cover plate 8 is screwed into place on the plates *6a* and *6b*, the thickness of gasket 10 provides a small space 92 (Figs. 4 and 7) between the upper surface of plate *6a* to the left of the cavity and the lower surface of the cover plate 8. This space has a thickness equal to the thickness of the gasket 10.

Since space 92 and holes 90 provide communication between the recesses 88 and cavity 7, the recesses 88, holes 90 and space 92 as well as the cavity 7 are all filled with liquid *7a*. Consequently, the entire transport mechanism within the cavity, including rolls 22 and 23, guide rolls 26 and 40, stationary guide members 44 and 60, drive capstan 52, tension roll 46, roll 56 and roll 63, as well as the spiral coil of tape 20, the layer of tape moving from the inside to the outside of the coil, the pair of reels 16 and 18, the bellows 86 and the gap faces of all the heads are all immersed in the liquid *7a*.

Holes 103 and 104 (Fig. 2) are provided in a side wall of cavity 7. One of the holes is for filling the cavity with liquid and the other for venting the cavity while it is being filled. The cover 8 is first secured to the plate 6 and then liquid is poured into the cavity by means of tubing and one of the holes until the cavity is filled and liquid pours out of the other vent hole. After the cavity has been filled, plugs 105 (Fig. 1) are used to seal the holes.

It is noted that rolls 22 and 23 are held in the same position regardless of the attitude of the recorder in space. Furthermore, roll 56 extends from the lower surface of top cover 8 to the bottom of recess *56a* and the bushings 15, *15a*, 27, *40a* and *46a* extend from the lower surface of top 8 to the bottoms of the recesses 19, *19a*, *26c*, *40c* and *46c* respectively, so that rolls 56, 16, 18, 26, 40 and 46 are held between the top 8 and the bottoms of their respective recesses in substantially the same position regardless of the attitude of the recorder in space. Note also that pin 48 extends from the top surface of slot 51 to the bottom surface of slot 50 and that pins 17, *17a*, 29, *40b* and 58 are anchored to floor 14. It is apparent that the vertical position of capstan 52 cannot change. Roll 63 and stationary guide members 30, 44 and 60 are fixed to the floor of the cavity and the heads are fixed in the plate. Consequently, these units are not affected by a change in attitude. The tops of these stationary units are too close to the top 8 to permit the tape to deviate from its guided path regardless of the attitude of the recorder. Furthermore, since the tape is in substantially neutral suspension in the liquid it is not affected by a change in attitude. Consequently, the recorder can operate efficiently in any attitude or position in space which makes it practical for use in missiles and other airborne equipment.

The cartridge 6 is small enough to be held in the palm of one hand, the particular cartridge shown in the drawings being 6 inches long, 4 inches wide and 1⅛ inches thick. Consequently, it is compact and economical to manufacture and can be used in situations where portability and compactness are of importance.

The tape is made from a polyester sold by E. I. du Pont de Nemours & Company under the trademark "Mylar." It plus its applied coatings has a mean specific gravity of 1.76. The liquid *7a* is a mixture of Fluorochemicals FC75 and heptane and has substantially the same specific gravity as the tape. All the guide rolls and the reels are made of nylon. The floating pin 48 on which the tension guide roll 46 is mounted is made of steel. The stationary guides 30, 44 and 60 may be made of a rigid plastic material and attached to the floor by screws or may be made of metal and integral with the plate 6.

Roll 63 can be omitted and the contoured end portion 62 of stationary guide 60 designed so as to guide the tape back to the outside of the coil. Furthermore, stationary guides can be inserted between reels 16 and 18 to aid in retaining the coil in the correct shape and in guiding the inner coil or layer of tape away from the inside of the coil, partially around the periphery of reel 16 and over the reel 18 and the top of the coil as it is pulled from the coil over roll 22. The elongated end *38a* of spring 38 can be replaced by a layer of felt glued to the rear face of bar 30. The peripheries of rolls 52 and 56 may each have a circumferential groove therein into which extends a finger forming a part of the contoured end *62a* in the case of roll 52 and a part of the contoured end 66 in the case of roll 56. This arrangement guarantees that the tape cannot wrap around the rolls 52 and 56.

The only parts of the transport mechanism which have one degree or more of freedom of translatory motion, i.e., freedom of translatory motion in one or more directions, in this unit are the tape and the tension guide roll assembly, including the nylon roll 46, metal bushing *46a* and the floating pin 48. Consequently, the dimensions of these parts of the tension guide roll assembly are selected so that the mean specific gravity of the assembly is substantially the same or reasonably close to the specific gravity of the liquid. However, the mean specific gravity of all the rotatable guide rolls can be made substantially equal or reasonably close to the specific gravity of the liquid.

In effect, since the specific gravity of the liquid is substantially the same as the specific gravity of the tape and the mean specific gravity of the tension roll assembly the tape and tension roll assembly are in substantially neutral suspension in the liquid.

The electronic units *97a* are mounted on a platform 98 (see Fig. 3) below platform 2 and they are connected with the heads of the recorder by leads 99. Since the electronic units do not form a part of the present invention, they are not described herein.

The recorder shown in the drawings and described herein operated efficiently at 75 *g*'s for a substantial length of time.

The present invention includes within its scope any device for recording and/or playing back or reproducing intelligence by means of a tape of some kind, the word tape being intended to include recorder tape as such, photographic film and any other kind of strip material of any cross sectional dimension such as wire, including a woven material, and flexible ceramic materials, etc., on which the intelligence can be recorded. This includes photographic and optical equipment of all kinds using strips of film.

The immersion of the various mechanical parts of the recorder in the liquid not only reduces the inertia forces on the parts but also protects the parts against external vibrations.

In Fig. 2, because parts have been removed from the cavity, the liquid level *7a* has dropped, as shown, slightly lower than the top of plates 6 and *6a*.

Although the present invention is particularly adapted for use in devices for recording intelligence by means of a tape, it is also adapted to be used in other apparatus in which it is desired to reduce inertia forces on, and vibration of, a transportable part such as a lever or a part having translatory motion. An example of such an apparatus is a potentiometer in which the parts are immersed in liquid.

I claim:

1. In a device for recording intelligence, a sealed cavity containing a liquid having fully immersed therein tape stored in said cavity and wound in multiple layers in contact with each other, said device also including an intelligence transmitting head and a transport mechanism comprising means for transporting the tape past said head and thence to means for storage, said liquid being effective to reduce inertia effects on said tape layers, the specific gravity of said liquid being equal to $$S.G.T.\frac{A.I.F.-E.I.F.}{A.I.F.}$$

where S.G.T. represents the specific gravity of the tape, A.I.F. represents the actual inertia force to which the device is intended to be subjected and E.I.F. represents an effective inertia force on the tape at which the tape will be satisfactorily transported, said liquid being chemically inert with respect to the parts with which it comes in contact.

2. A device according to claim 1, said tape being stored in the form of a bundle of coils at least some of which contact each other, said bundle being fully immersed in said liquid.

3. A device according to claim 2, said bundle being coiled around reel means, said reel means being fully immersed in said liquid.

4. A device according to claim 1, said tape comprising a continuous loop tape and being stored in the form of a plurality of coils spirally wound around each other to provide a tape bundle, said coils in said bundle being in contact with each other and being fully immersed in said liquid, said transport mechanism comprising means for simultaneously removing tape from and returning tape to said plurality of coils, said coils being slidably moved with respect to each other by said tape moving means.

5. A device according to claim 1 wherein said liquid has substantially the same specific gravity as said tape means.

6. A device according to claim 3 wherein said liquid has substantially the same specific gravity as said tape means and substantially the same specific gravity as the mean specific gravity of said reel means.

7. A device according to claim 1 wherein said liquid has substantially the same specific gravity as the mean specific gravity of the parts which are immersed therein and which have substantial freedom of motion.

8. A device according to claim 1, wherein said transport mechanism includes a driving capstan and guide means adapted to be moved into and out of driving relationship with said capstan, said transport mechanism being immersed in said liquid and said liquid having substantially the same specific gravity as said tape and substantially the same specific gravity as the mean specific gravity of said guide means.

9. A device according to claim 1, said tape being stored in the form of a bundle of tape coils which contact each other and which are substantially fully immersed in said liquid at substantially all attitudes of the device.

10. A device according to claim 1, wherein said transport mechanism is immersed in said liquid, the mean specific gravity of the parts of said transport mechanism which have freedom of translatory movement of not less than one degree being selected to reduce the inertia force on said parts from said inertia force to which said device is intended to be subjected to a desired effective inertia force under which said parts retain said freedom of movement when said device is subjected to said inertia force to which said device is intended to be subjected.

11. A device according to claim 1, said head comprising a recording head for transmitting intelligence to said tape, said device also including a playback head for reproducing intelligence from said tape, the gap surface of at least one of said heads being immersed in said liquid, said heads being non-yieldably mounted in said device.

12. A device according to claim 1, said liquid comprising a chemically inert halogenated carbon compound.

13. A device according to claim 1, said liquid comprising a fluorinated organic carbon compound.

14. A device according to claim 1, said transport mechanism also being immersed in said liquid.

15. A device according to claim 1, the gap surface of said head being immersed in said liquid.

References Cited in the file of this patent

UNITED STATES PATENTS

| | | |
|---|---|---|
| 1,851,774 | Rogers | Mar. 29, 1932 |
| 2,470,494 | Kennison | May 17, 1949 |
| 2,615,989 | Thad | Oct. 28, 1952 |
| 2,671,202 | Petroff | Mar. 2, 1954 |
| 2,674,119 | Trainor | Apr. 6, 1954 |
| 2,679,394 | Lear | May 25, 1954 |
| 2,712,448 | Schroter | July 5, 1955 |
| 2,772,135 | Hollabaugh | Nov. 27, 1956 |
| 2,778,624 | Statham | Jan. 22, 1957 |

OTHER REFERENCES

Ser. No. 393,493, Fries (A.P.C.), published May 25, 1943.